United States Patent [19]

Scheinert et al.

[11] Patent Number: 5,204,656
[45] Date of Patent: Apr. 20, 1993

[54] PAGING RECEIVER WITH POWER SUPPLY DIVIDER

[75] Inventors: Stefan Scheinert, Eckental/Brand, Fed. Rep. of Germany; Hervé Hillion, Gallardon, France

[73] Assignee: U. S. Philips Corporation, New York, N.Y.

[21] Appl. No.: 657,879

[22] Filed: Feb. 19, 1991

Related U.S. Application Data

[63] Continuation of Ser. No. 549,651, Jul. 9, 1990, abandoned, which is a continuation of Ser. No. 216,939, Jul. 8, 1988, abandoned.

[30] Foreign Application Priority Data

Jul. 10, 1987 [DE] Fed. Rep. of Germany ....... 3722799

[51] Int. Cl.⁵ ............................................. H04Q 1/30
[52] U.S. Cl. ............................. 340/311.1; 340/825.44; 455/343
[58] Field of Search ............... 455/343, 227, 228, 142; 340/825.44, 825.48, 636, 311.1; 370/58, 62

[56] References Cited

U.S. PATENT DOCUMENTS

| | | | |
|---|---|---|---|
| 4,353,065 | 10/1982 | Mori | 340/825.44 |
| 4,417,246 | 11/1983 | Agnor et al. | 340/825.44 |
| 4,479,261 | 10/1984 | Oda et al. | 340/825.44 |
| 4,506,386 | 3/1985 | Ichikawa et al. | 455/343 |
| 4,652,875 | 3/1987 | Waki | 340/825.44 |
| 4,768,031 | 8/1988 | Mori et al. | 340/825.44 |
| 4,837,854 | 6/1989 | Oyagi et al. | 455/343 |
| 4,839,639 | 6/1989 | Sato et al. | 340/825.44 |
| 4,870,403 | 9/1989 | Mori et al. | 340/825.44 |
| 4,928,100 | 5/1990 | Andros et al. | 340/311.1 |

*Primary Examiner*—Jin F. Ng
*Assistant Examiner*—Brent A. Swarthout
*Attorney, Agent, or Firm*—David R. Treacy

[57] ABSTRACT

A paging receiver having a receiver section for receiving a digital data, and an evaluation section for developing, in response to the received digital data, digital output words including identification codes. A register stores an identification code, and a comparator compares digital output words from the evaluation section with the stored identification code. The receiver has a controlled divided power supply which is controlled according to whether the evaluation section outputs a digital word identical to the stored identification code.

20 Claims, 2 Drawing Sheets

PAGING RECEIVER WITH POWER SUPPLY DIVIDER

This is a continuation of application Ser. No. 549,651, filed Jul. 9, 1990 which was a continuation of Ser. No. 216,939, filed Jul. 8, 1988, both abandoned.

BACKGROUND OF THE INVENTION

The invention relates to a paging receiver having a receiver section for producing digital data from a received signal and having an evaluation section for evaluating the digital data and having a power supply divider with which at least one power supply to the receiver section can be switched on and off.

A case in which such a paging receiver can be used is a car telephone, in which the paging receiver forms a part of the receiver. In portable versions of a car telephone the batteries required for the power supply have to be carried along. Therefore, power-saving measures which lengthen the useful life of a set of batteries are highly desirable. During transmission there is a relatively high power consumption, but only for the usually short duration of a telephone conversation. In comparison with the power consumption of the receiver the power consumption of the transmitter is comparatively small. As the receiver of the car telephone has to be in operation uninterruptedly for accessibility at any time, because a paging call may come in at any time, even relatively small power savings in the receiver can have a decisive effect on the overall power consumption.

In the European Patent Specification No. 0 092 219 and corresponding U.S. Pat. No. 4,479,261 paging receiver is disclosed, which comprises among other things a receiver section, an evaluation logic and a power supply divider. The receiver section divides into two receiver sub-sets which, independently, can be disconnected from the power supply by the power supply divider, whereas the extent sub-sets remain connected to the power supply. Each receiver sub-set is assigned a timing element.

The individual paging receivers are arranged in groups, one time slot of a time-division multiplex frame being provided for each group. In a time slot a data block is transmitted which, for the selection of a single paging receiver (paging call), contains the address code assigned to this paging receiver.

The receiver sub-sets, after receiving the beginning of the data block, remain connected to the power supply for a preset fixed time interval, called time-on time interval hereinafter. To save energy, the power supply to the receiver sub-sets is interrupted after the time-on time interval has ended for a second time interval, called time-off time interval hereinafter. As no data must be lost for the evaluation of the data block, the time-on time interval mentioned in the above Patent Specification is determined such that it has not finished until the end of the assigned data block. The time-off time interval is determined such, that the receiver section is again fully operative at the beginning of the next assigned time slot. When the timing elements are adjusted, the time delay of the different receiver sub-sets has been taken account of, so that the power supplies to the receiver sub-sets are again switched on at different instants, while these instants have a preset value relative to the beginning of the time slots. This subdivision avoids the time-on interval of the power supply to the receiver section having to be adjusted to the receiver sub-set having the largest time delay.

Such a circuit can always be used if between the end of the data block and the beginning of the next interesting data block there is a fixed time interval, which has to exceed the time delay of the receiver sub-set having the largest time delay. If the end and beginning of the data blocks, however, occur in shorter time intervals or immediately after each other, no energy saving can be achieved any longer with the abovedescribed circuit arrangement as the time-off time interval becomes zero.

Therefore, the present invention has for its object to provide a circuit arrangement of the type mentioned in the preamble, in which energy saving is achieved by temporarily switching off sub-sets even if the time interval between the end of a received data block and the beginning of the next data block still to be received is shorter than the time delay of the sub-sets to be switched off for the purpose of the energy saving.

SUMMARY OF THE INVENTION

According to the invention this object is achieved, in that the evaluation section and a comparing register are connected to one comparator and the output of the comparator is connected to the power supply divider. Because of the immediate comparison of the received data with the data which can be preset by means of the comparing register, already during the reception of a data block a decision is formed by the comparator whether the data which can still be received till the end of the data block are important for the evaluation of the whole data block. This is advantageous, in that in most cases a data block does not have to be received over its entire length and the receiver sub-sets can already be switched off before the end of the data block.

BRIEF DESCRIPTION OF THE DRAWINGS

The invention will now be further described with reference to the embodiments shown in the drawings, in which.

DETAILED DESCRIPTION OF THE INVENTION

Figure 1:
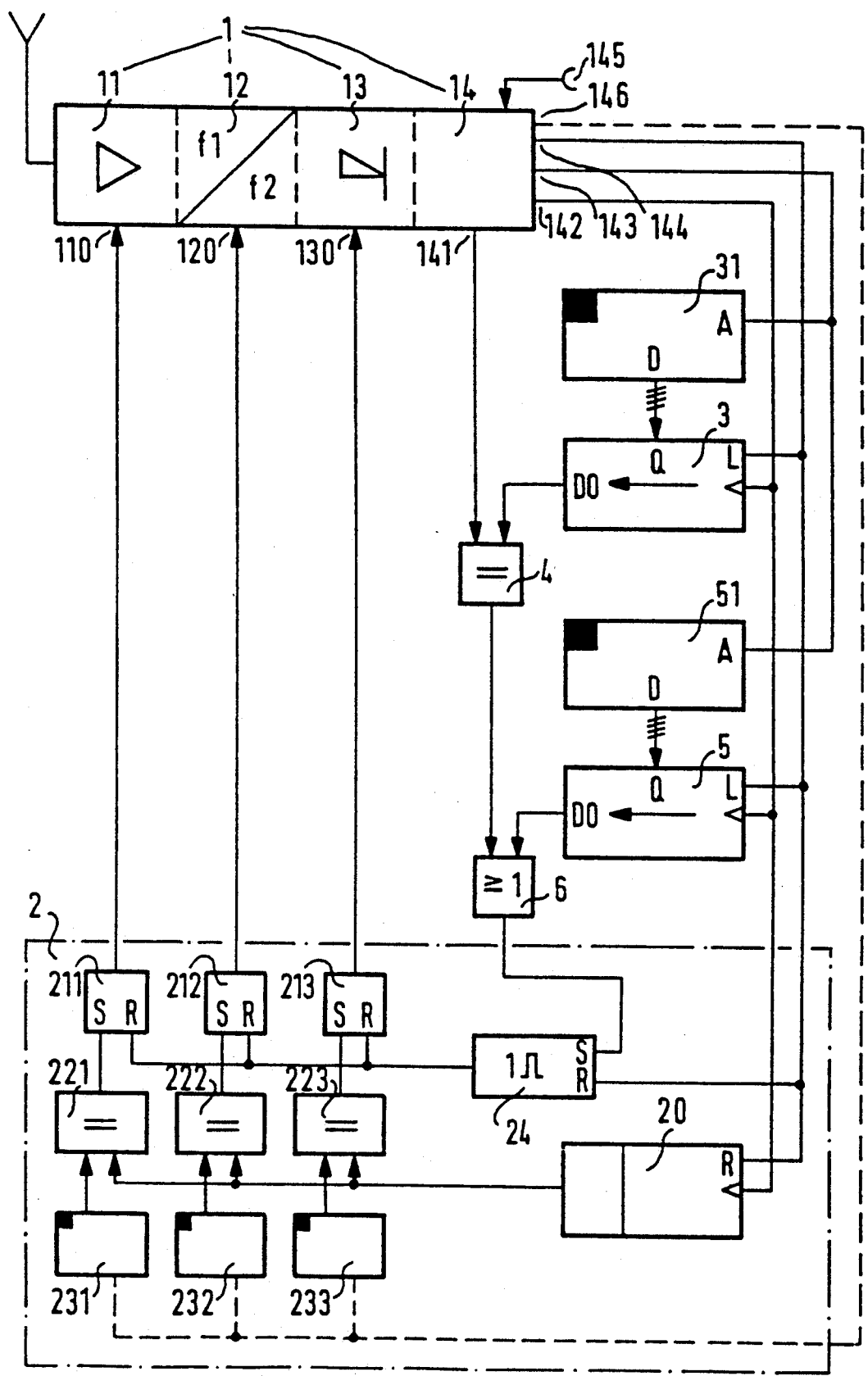
FIG. 1 shows in a block diagram the circuit arrangement of a paging receiver.

The receiver section of the paging receiver diagrammatically shown in FIG. 1 forms a part of the mobile station of a car telephone. It comprises three receiver sub-sets 11, 12 and 13. Each receiver sub-set has its individual power supply link 110, 120, 130, which is independent of the power supply of the other two sub-sets. These links are connected to the output terminals of the respective operating power switches 211, 212 and 213 of the power supply divider 2. An evaluation section 14 connected to the receiver sub-set 13 produces a synchronization signal, a clock signal and a digital data signal from the received signal comprising a frame-synchronization signal, a bit-synchronization signal and a data signal. The digital data signal can be taken off at the output 141 of the evaluation section.

Figures 2, 3:
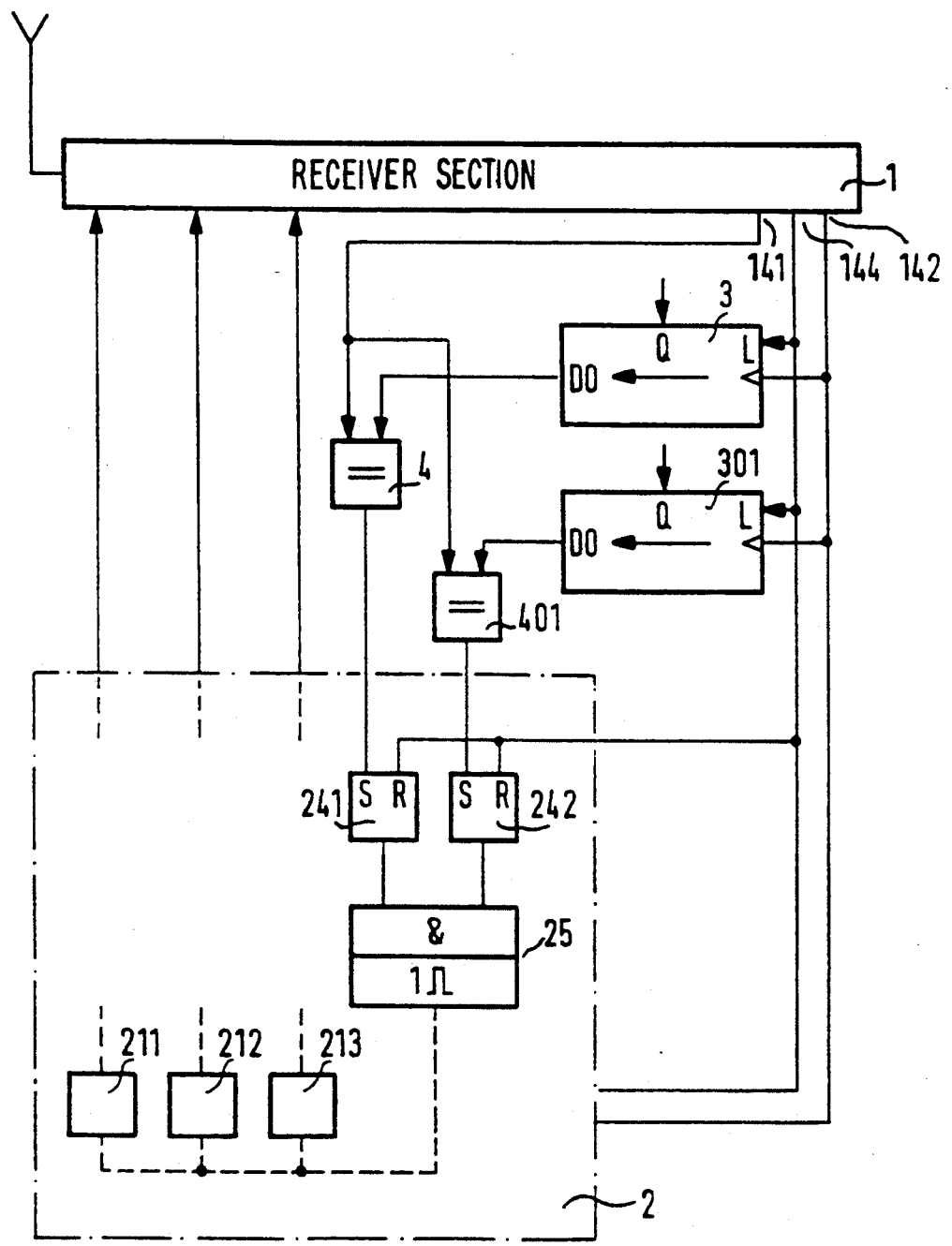
FIG. 2 diagrammatically shows the structure of a data block.
FIG. 3 shows a further advantageous embodiment of the invention.

The structure of a data block of this digital signal is represented in FIG. 2. The data block contains 64 bits. Each 4 bits form a digit. The first three digits N1, N2, N3 together form a channel number. With the channel number transmitted in the data block the receiver can verify whether it receives the correct channel. Then follows the digit P, an operational code, by which the various meanings of the data block are determined. For example, operational code 12 on the calling channel specifies a paging call from the radio control transmitter to a mobile station. The next two digits Y1, Y2 form the number specifying the radio control zone, in which the paging receiver is located. The next seven digits Z, X1, X2, X3, X4, X5, X6 form the identification number of the paging receiver, while the last three digits I1, I2, I3 of this data block may contain additional information. However, with the paging call this data block does not contain any further information to be evaluated.

The clock signal which is synchronous with the data signal is present at the output 142. At the begining of each individual data block the evaluation section 14 produces a synchronization pulse which is furnished to output 144. Through an input 145 control signals can be applied to the evaluation section by a control logic not represented in FIG. 1. As a result of these control signals the evaluation logic assumes various evaluating conditions (for example, Wait for paging call; Wait for allocation of a transmission channel), to which various status signals are assigned.

These status signals are furnished to the output 143 and from there to the address inputs A of two status memories 31 and 51. The status memories are structured as storage modules, in which the data outputs D of the first status memory 31 are connected to the data inputs Q of a comparing register 3 and the data outputs D of the second status memory 51 are connected to the data inputs Q of a mask register 5. The comparing register 3 and the mask register 5 are arranged as shift registers having parallel loading inputs Q. The load-signal inputs L of these registers 3 and 5 are connected to the synchronization pulse output 144, and the clock inputs of the registers 3 and 5 to the clock output 142 of the evaluation section 14. The comparing register 3 contains the data message which has to be compared to the received data, whereas with the aid of the data contained in the mask register 5 single data bits or parts of the received data blocks, respectively, can be exempted from the comparison.

With each synchronization pulse the comparing register 3 and the mask register 5 are loaded in parallel with a data message, which is serially read out at each clock signal. In this operation the status signal leads to the choice of a data message assigned to the evaluation status out of the data messages stored in the status memory.

The output 141 of the evaluation section is connected to the first input of a comparator 4, which is arranged as an equivalence gate, and the second input of the comparator 4 is connected to the output DO of the comparing register 3. After each bit of the evaluated digital signal there is at output 142 a clock pulse which makes the registers 3 and 5 shift by one bit. The output of the comparator 4 is connected to the first input of a data filter 6, which is arranged as an OR-gate, and the second input of the data filter 6 is connected to the output DO of the mask register 5.

In the ready-to-receive status the paging receiver of the mobile station expects a paging call on a calling channel. Thereto, the comparing register 3 is loaded with the data which are preset by the message format of a paging call, and stored in the status memory 31 of the comparing register. This is the channel number $N_1$, $N_2$, $N_3$ of the calling channel, the operational code P and the subscriber's own identification number Z, X1, X2, X3, X4, X5, X6 of the mobile station. As long as the received data bits correspond with the data bits read out from the comparing register 3, the output of the comparator 4 shows a High level, and in case there is no correspondence a Low level. As the radio control zone in which the paging receiver is located is insignificant for the evaluation of a received paging call, the received number of the radio control zone must not affect the result of the comparison.

Therefore, the output of comparator 4 is not directly connected to the power supply divider 2. The output signal of the comparator is first applied to the input of a data filter 6. In the mask register 5 the positions at which the number of the radio control zone is located in the message format are characterized by binary ones, whereas the remaining positions are characterized by binary zeroes.

In the data filter 6 the output signal of the comparator 4 is combined with the output signal of the mask register 6 such that the output signal of the comparator passes through the data filter unchanged always when the respective positions of the mask register contain zeroes. At the positions where there are binary ones in the mask register, the output of the data filter always shows a High-signal, irrespective of the actual output signal of the comparator. In this way it is guaranteed that the received number of the radio control zone is allowed to show arbitrary values, without the fear that the power supply is switched off prematurely.

The output of the data filter 6 is connected to the set input of a time-off pulse emitter 24, while the reset input of the time-off pulse emitter 24 is connected to the synchronization pulse output 143 of the evaluation section. The output of the time-off pulse emitter 24 is connected to the reset inputs of the operating power switches 211, 212 and 213. The time-off pulse emitter is arranged such that when the input signal changes from High to Low it furnishes a pulse on its output, and then does not furnish any further pulses until the next reset signal.

At the beginning of one of the individual data blocks the time-off pulse emitter 24 is reset by the synchronization pulse. Now, once the output level changes from High to Low at the output of the data filter 6, the output pulse of the time-off pulse emitter resets the operating power switches 211, 212 and 213 associated with the individual sub-sets.

The individual operating power switches are reset independently at specific instants by a timing means. In the exemplary embodiment this timing means consists of a counter 20, three binary word comparators 221, 222, 223 and three control word memories 231, 232 and 233. Also at the beginning of each data block the counter is reset by the synchronization pulse. The clock input of the counter is also connected to the clock output 142 of the evaluation section, so that it increments the clocks from the beginning of the synchronization pulse. The output of the counter 20 is connected to the first inputs of the binary word comparators 221, 222, 223. The second inputs of the binary word comparators are connected to the respective associated control word memories 231, 232 and 233. Once a binary word comparator establishes the correspondence of the binary word present at its second input with the word supplied by the counter 20, it sets via its output the respective operating power switches 211, 212 and 213, and the respective receiver sub-set is again connected to the operating power.

In this way the power supply to the individual sub-sets is maintained for as long as it is absolutely necessary. Switching on again the power supply to the individual sub-sets is optimized with respect to the different switch delays and response times for the power supply to the individual sub-sets, so that at the beginning of the time slot all sub-sets are operative again.

In the exemplary embodiment shown, the operating power switches 211, 212 and 213 switch on and off the operating power to the individual receiver sub-sets. An improvement is feasible by using integrated circuits with a so-called "power-down-mode". As a result of a logical signal an internal operating power switch is turned on and off, respectively, at the "power-down" input of such a circuit. If for the arrangement of the receiver section 1 such circuits are used for the individual sub-sets of input stage 11, mixer 12 and demodulator 13, their connection to the operating power is linked with the operating power supply to the paging receiver, whereas the outputs of the operating power switches 211, 212 and 213, are connected to the "power-down" inputs of the circuits. In this case the operating power switch concerned only has to provide the power for the logical switching signals which is negligibly small compared to the power consumption of the circuit.

The aforedescribed operational mode of the paging receiver is related to the evaluation condition in which the paging receiver is waiting for a paging call. However, if the subscriber himself wishes to hold a telephone conversation, the transmitter requests a free transmission channel from the radio control computer. Subsequently, the receiver has to wait for the channel number assigned by the radio control computer. Because also data which are not meant for the paging receiver are received while it is waiting for its own free channel, here too energy saving can be realized in the way described hereinbefore. However, as the data which are now expected are different from a paging call, the receiver is moved to the evaluation status by means of a control signal present at the status signal input 145. Thus, the two registers 31 and 51 are loaded with different data messages. These data contain, for example, a different operational code.

As a result of the different evaluation statuses, the paging receiver can always be adapted to the expected data, so that an unnecessary power consumption in the paging receiver is avoided as much as possible.

In the exemplary embodiment the individual receiver sub-sets are switched on such that they are operative again at the beginning of the time slot subsequent to the switching off. This has for its object that the frame and bit-synchronization signals preceding the beginning of the data block depicted in FIG. 2 can be received and the oscillators contained in the evaluation section 14 can be post-synchronized. In practice, however, it has appeared that these oscillators can be structured with such frequency stability that a post-synchronization is only required at each twentieth time slot at the earliest.

In a further advantageous exemplary embodiment programmable registers each having at least two different stored binary words are used as control word memories 231, 232, 233. The control inputs of these programmable registers, by means of which one of the stored binary words is selected and applied to the outputs of the control word memories, are connected to the output 146 of the evaluation section 14. This arrangement is shown in FIG. 1 by means of dashed connecting lines. In evaluation section 14 a time slot counter is added, each time counting to 20. At each twentieth time slot a control signal is furnished at output 146.

In addition to the above binary words stored in the control word memories 231, 232, 233, which are read out by means of the control signal, binary words are stored that are available at the output in the remaining time slots. The values of these binary words are chosen such that the individual receiver sub-sets are operative again not at the beginning of the time slot but only at the beginning of the data block. This is advantageous in that in this way in addition to the saving of the power consumption described hereinbefore a further reduction of the power consumption can be realized in a simple way.

FIG. 3 shows a further schematic exemplary embodiment, in which the same reference characters are used for the same sub-sets as shown in FIG. 1. For a graphic description, a subdivision of the receiver section 1 and the operating power divider 2 is dispensed with, insofar as their function does not change with respect to the embodiment shown in FIG. 1.

The data output of the comparing register 3 is connected to an input of the comparator 4 and the data output of a second comparing circuit 301 is connected to an input of a second comparator 401. The second inputs of the comparators 4 and 401 are interconnected and connected to the data output 141 of the receiver section 1. The outputs of the comparators 4 and 401 are each connected to a set input of the respective time-off flipflops 241 and 242. The reset inputs of the time-off flipflops 241 and 242 are connected to the synchronization pulse output 144 of the receiver section 1. The output signals of the time-off flipflops 241 and 242 are fed to a combining means 25, which does not produce an output pulse until all input signals are present. The output of the combining means is connected to the reset inputs of the operating power switches 211, 212 and 213.

This exemplary embodiment offers the advantage that the paging receiver can wait for plural data blocks, for example, single call or group call. Only when it is guaranteed that neither of the two possible messages is received—both comparators have produced a time-off signal—does the combining means apply the cumulated time-off signal to the reset inputs of the operating power switches. In this way also in operating conditions in which various data blocks can be expected, a safe evaluation of the data blocks is provided, without having to dispense with energy saving. It is also simply possible with this exemplary embodiment to insert a corresponding number of data filters. In this case the outputs of the comparators 4 and 401 are to be connected to the input of the respective associated data filters and the outputs of the data filters to the respective time-off flipflops 241 and 242.

What is claimed is:

1. A paging receiver including a receiver section for producing received digital data from a received signal, an evaluation section for evaluating the digital data, and a power supply divider for selectively switching on and off at least one power supply to the receiver section, characterized in that said paging receiver comprises:

a comparing register for storing a data message which is to be compared with a part of a digital data block of received digital data to determine if the received data are a part of a data block to be processed further, and a comparator for comparing an already-received portion of a part of the digital data block with the corresponding portion of the data message stored in the comparing register, prior to receipt of all said part of the digital data block, and providing an output signal responsive to non-correspondence of said already-received portion with said corresponding portion prior to receipt of all said corresponding part, and said power supply divider comprises means for switching off said at least one power supply responsive to said output signal, to reduce power consumption prior to receipt of all said part of the digital data block which is not to be processed further.

2. A receiver as claimed in claim 1, characterized in that said paging receiver further comprises a data filter for filtering said output signal, said means for switching off being responsive to the filtered output signal.

3. A receiver as claimed in claim 2, characterized in that said paging receiver further comprises a mask register for storing data bits whose value indicates whether or not respective corresponding parts of a data block are to be evaluated for controlling said means for switching.

4. A receiver as claimed in claim 3, characterized in that said power supply divider comprises a plurality of power supplies for respective sub-sections of said receiver section, and said means for switching off comprises timing means receiving said filtered output signal, for controlling timing of switching on at least one of said plurality of power supplies.

5. A receiver as claimed in claim 4, characterized in that said evaluation section provides a status signal, and said paging receiver comprises a status memory for storing a plurality of data messages for comparison with received digital data, and means responsive to said status signal for supplying a selected one of said data messages to said comparing register.

6. A receiver as claimed in claim 5, characterized in that said paging receiver comprises a further status memory for storing a plurality of digital words, and means responsive to said status signal for supplying a selected one of said digital words to said mask register.

7. A receiver as claimed in claim 6, characterized in that said comparator is a serial comparator, and said comparing register and mask register are shift registers.

8. A receiver as claimed in claim 1, characterized in that said paging receiver further comprises a mask register for storing data bits whose value indicates whether or not respective corresponding parts of a data block are to be evaluated for controlling said means for switching.

9. A receiver as claimed in claim 1, characterized in that said power supply divider comprises a plurality of power supplies for respective sub-sections of said receiver section, and said means for switching comprises timing means receiving said filtered output signal, for controlling timing of switching of at least one of said plurality of power supplies.

10. A receiver as claimed in claim 1, characterized in that said evaluation section provides a status signal, and said paging receiver comprises a status memory for storing a plurality of data messages for comparison with received digital data, and means responsive to said status signal for supplying a selected one of said data messages to said comparing register.

11. A receiver as claimed in claim 1, characterized in that said paging receiver comprises a second comparing register for storing a further data message which is to be compared with received digital data to determine if the received data are to be processed further, a second comparator for comparing already-received parts of a digital data block with corresponding parts of the data message stored in the second comparing register, prior to receipt of a complete data block, and providing a second output signal responsive to non-correspondence of said already-received parts with said corresponding parts, and means for combining said second output signal with said output signal to form a combined output signal, said means for switching off being responsive to said combined output signal.

12. A receiver as claimed in claim 11, characterized in that said comparators are serial comparators, and said comparing registers are shift registers.

13. A paging receiver as claimed in claim 1, characterized in that a digital data block of part of said received digital data is an identification number identifying said receiver.

14. A transceiver including a receiver section adapted for receiving signals including paging signals, and producing digital data therefrom, an evaluation section for evaluating the digital data, and a power supply divider for selectively switching on and off at least one power supply to the receiver section, characterized in that said transceiver comprises:

a comparing register for storing a data message which is to be compared with a part of a digital data block of received digital data to determine if the received data are a part of a data block to be processed further, and a comparator for comparing an already-received portion of a part of the digital data block with the corresponding portion of the data message stored in the comparing register, prior to receipt of all said part of the digital data block, and providing an output signal responsive to non-correspondence of said already-received portion with said corresponding portion prior to receipt of all said corresponding part, and said power supply divider comprises means for switching off said at least one power supply responsive to said output signal, to reduce power consumption prior to receipt of all said part of the digital data block which is not to be processed further.

15. A transceiver as claimed in claim 14, characterized in that said transceiver further comprises a data filter for filtering said output signal, said means for switching off being responsive to the filtered output signal.

16. A transceiver as claimed in claim 15, characterized in that said transceiver further comprises a mask register for storing data bits whose value indicates whether or not respective corresponding parts of a data block are to be evaluated for controlling said means for switching.

17. A transceiver as claimed in claim 16, characterized in that said power supply divider comprises a plurality of power supplies for respective sub-sections of said receiver section, and said means for switching off comprises timing means receiving said filtered output signal, for controlling timing of switching on at least one of said plurality of power supplies.

18. A transceiver as claimed in claim 17, characterized in that said evaluation section provides a status signal, and said transceiver comprises a status memory for storing a plurality of data messages for comparison with received digital data, and means responsive to said status signal for supplying a selected one of said data messages to said comparing register.

19. A transceiver as claimed in claim 18, characterized in that said transceiver comprises a further status memory for storing a plurality of digital words, and means responsive to said status signal for supplying a selected one of said digital words to said mask register.

20. A transceiver as claimed in claim 14, characterized in that said comparator is a serial comparator, and said comparing register is a shift register.

* * * * *